(12) United States Patent
Chung et al.

(10) Patent No.: US 6,785,209 B2
(45) Date of Patent: Aug. 31, 2004

(54) OPTICAL PICKUP FOR IMPROVING PROPERTIES OF A REPRODUCTION SIGNAL

(75) Inventors: Chong-sam Chung, Suwon (KR); Tae-kyung Kim, Suwon (KR); Young-man Ahn, Suwon (KR); Hea-jung Suh, Seongnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 09/755,175

(22) Filed: Jan. 8, 2001

(65) Prior Publication Data

US 2001/0021150 A1 Sep. 13, 2001

(30) Foreign Application Priority Data

Jan. 6, 2000 (KR) ............................................ 2000-521
Jan. 6, 2000 (KR) ............................................ 2000-520

(51) Int. Cl.⁷ ................................................ G11B 7/00
(52) U.S. Cl. .................................................. 369/53.19
(58) Field of Search .......................... 369/44.32, 44.37, 369/53.19, 53.13, 53.2, 53.22, 53.35, 44.23, 112.02, 112.05, 112.1, 112.15, 112.16, 124.02, 124.03, 124.1, 124.11, 124.12

(56) References Cited

U.S. PATENT DOCUMENTS

| 5,065,380 A | * | 11/1991 | Yokota ..................... 369/44.41 |
| 5,513,164 A | * | 4/1996 | Tanaka et al. .............. 369/53.2 |
| 5,751,680 A | | 5/1998 | Ishibashi et al. |
| 5,768,232 A | | 6/1998 | Muramatsu et al. |
| 6,034,935 A | * | 3/2000 | Kim et al. ................ 369/53.28 |
| 6,246,648 B1 | * | 6/2001 | Kuribayashi ............. 369/44.32 |
| 6,249,498 B1 | * | 6/2001 | Miyanabe et al. ....... 369/53.19 |
| 6,507,544 B1 | * | 1/2003 | Ma et al. .................. 369/44.32 |
| 6,545,958 B1 | * | 4/2003 | Hirai et al. .............. 369/44.32 |

FOREIGN PATENT DOCUMENTS

| EP | 1 076 333 | 2/2001 |
| JP | 64-1122 | 1/1989 |
| JP | 1-315039 | 12/1989 |
| JP | 7-121876 | 5/1995 |
| JP | 7-320295 | 12/1995 |
| JP | 8-147709 | 6/1996 |
| JP | 8-212557 | 8/1996 |
| JP | 11-250475 | 9/1999 |
| JP | 2000-268390 | 9/2000 |

OTHER PUBLICATIONS

Yokogawa et al.: "Signal Processing for 15/27 GB Read–Only Disk System" *Joint International Symposium on Optical Memory and Optical Data Storage*. vol. 39, No. 2B, pp 819–823.

Katayama et al.: "Land/Groove Signal and Differential Push–Pull Signal Detection for Optical Disks by an Improved 3–Beam Method" *Japanese Journal of Applied Physics*. vol. 38, No. 3B, Mar. 1999.

* cited by examiner

*Primary Examiner*—Thang V. Tran
(74) *Attorney, Agent, or Firm*—Staas & Halsey LLP

(57) ABSTRACT

An optical pickup capable of focusing a main light spot and an auxiliary light spot including optical aberration when an optical disk is not tilted, and analyzing the main light spot and the auxiliary light spot with a photodetector, thereby correcting aberration. The optical pickup includes a light source emitting light; light splitting means for splitting an incident beam into at least two light beams including a first beam and a second beam so as to form at least two light spots on an optical disk; optical path changing means for changing the traveling path of the incident first and second beams; an objective lens focusing the first and second beams to form a main light spot and an auxiliary light spot, respectively, on the optical disk; a photodetector having first and second light receiving portions receiving the first and second beams reflecting from the optical disk and passing through the optical path changing means, respectively, and performing photoelectric conversion on the received beams to produce and detect electrical signals; and a signal processor correcting aberration caused by tilting of the optical disk, using the electrical signals.

33 Claims, 14 Drawing Sheets

SPm

SPs

SPm

SPs

OPTICAL PICKUP FOR IMPROVING PROPERTIES OF A REPRODUCTION SIGNAL

CROSS-REFERENCE TO RELATED APPLICATIONS

This application claims the benefit of Korean Application No. 00-520 and Korean Patent Application No. 00-521, both filed Jan. 6, 2000, in the Korean Patent Office, the disclosures of which are incorporated herein by reference.

BACKGROUND OF THE INVENTION

1. Field of the Invention

The present invention relates to an optical pickup capable of effectively correcting aberration caused by the tilt of an optical disk, with improved defocus properties, in which two light spots, a main light spot and an auxiliary light spot having optical aberration, are focused on the optical disk, and then received by a photodetector and analyzed for the correction.

2. Description of the Related Art

In general, optical pickups are utilized in recording information on or reproducing information from an optical disk. As the recording density of optical disks increases, the need for a light source emitting short wavelength light, and an objective lens having a higher numerical aperture NA increases. On the other hand, when information is recorded on or reproduced from an optical disk using an optical pickup, if the optical disk is arranged at a predetermined angle with respect to the optical axis, i.e., if the recording surface of the optical disk is tilted with respect to the optical axis, coma aberration occurs due to the tilting of the disk. As for an optical pickup for high-density recording, which adopts a light source emitting short wavelength light and an objective lens having a higher NA, when a high-density optical disk is adopted, spherical aberration is caused in an optical system that is compatible with a low-density optical disk, by variations in the thickness of optical disks and the wavelength of light. Furthermore, as the NA of the objective lens increases, the focal depth decreases to control reproduction properties. As a result, there is a need for accurately controlling defocusing caused by an error in adjusting the working distance between the optical disk and the objective lens.

Coma aberration $W_{31}$ satisfies the following condition (1). Coma aberration $W_{31}$ suddenly increases at a higher NA, compared to a lower NA, if the tilt angle of the optical disk is the same.

$$W_{31} \propto NA^3 \qquad (1)$$

Recording density of an optical disk is determined by the wavelength $\lambda$ of light emitted from a light source, and the NA of an objective lens, which is expressed by formula (2):

$$\text{diameter of light spot} \propto \frac{\lambda}{NA} \qquad (2)$$

Spherical aberration $W_{40d}$ caused by a thickness variation $\Delta D$ of optical disks satisfies the following formula (3):

$$W_{40d} = \frac{n^2-1}{8n^3}(NA)^4 \frac{\Delta d}{\lambda} \qquad (3)$$

where n is the refractive index of an optical disk substrate, and d is the thickness of the optical disk substrate.

In order to increase the recording density of the optical disk to about 15 gigabytes (GB) per disk or more, based on formula (2), a light source capable of emitting short wavelength light of about 410 nm, and an objective lens having an NA of 0.6 or more are needed. However, when the NA of the objective lens is increased for high-density recording, spherical aberration $W_{40d}$ caused by thickness variations of optical disks, which is proportional to the fourth power of the NA, highly increases.

Referring to FIG. 1, a conventional aberration correcting apparatus, which is designed to correct both coma aberration and spherical aberration, includes an objective lens 3 for focusing incident light, and a condensing lens 5 for focusing more incident light to form a light spot on an optical disk 1.

In the case where the optical disk 1 is tilted in a predetermined direction, the condensing lens 5 is driven to be tilted parallel to that direction, thereby correcting coma aberration.

In the conventional aberration correcting apparatus having the configuration above, the objective lens 3 and the condensing lens 5 are driven at a predetermined angle for tracking and focusing control, or only the condensing lens 5 is driven at a predetermined angle, so that the configuration of an actuator for the apparatus becomes complicated.

In addition, the need for high-density recording at 15 GB or more causes the problem of crosstalk to occur due to interference from neighboring tracks when information is reproduced from a track.

SUMMARY OF THE INVENTION

To solve the above problems, it is an object of the present invention to provide an optical pickup capable of improving the properties of a reproduction signal, in which coma aberration caused by the tilt of an optical disk and defocus properties can be corrected using at least two light spots focused on the optical disk.

Additional objects and advantages of the invention will be set forth in part in the description which follows, and, in part, will be obvious from the description, or may be learned by practice of the invention.

The above and other objects of the present invention are achieved by an optical pickup comprising: a light source emitting light; light splitting means for splitting an incident beam into at least two light beams including a first beam and a second beam so as to form at least two light spots on an optical disk; optical path changing means for changing the traveling path of the first and second beams reflected from the optical disk; an objective lens focusing the first and second beams to form a main light spot and an auxiliary light spot, respectively, on the optical disk; a photodetector having first and second light receiving portions receiving the first and second beams reflecting from the optical disk and passing through the optical path changing means, respectively, and performing photoelectric conversion on the received beams to produce and detect electrical signals; and a signal processor correcting aberration caused by tilting of the optical disk, using the electrical signals.

In another embodiment, there is provided an optical pickup comprising: a light source emitting light; light splitting means for splitting an incident beam into at least two light beams including a first beam and a second beam so as to form at least two light spots on an optical disk, wherein one of the first and second beams includes optical aberration; optical path changing means for changing the traveling path of the first and second beams reflected from the optical disk; an objective lens for focusing the first and second beams to form a main light spot and an auxiliary light spot, respectively, on the optical disk; a photodetector having first and second light receiving portions receiving the first and second beams reflecting from the optical disk and passing through the optical path changing means, respectively, the first and second light receiving portions each including a plurality of light receiving areas receiving and photoelectrically converting central light and peripheral light, separately, of the first and second beams to detect electrical signals; and a signal processor correcting crosstalk, and aberration caused by tilting and thickness variation of the optical disk.

BRIEF DESCRIPTION OF THE DRAWINGS

The above and other objects and advantages of the present invention will become more apparent by describing in detail preferred embodiments thereof with reference to the attached drawings in which.

DETAILED DESCRIPTION OF THE INVENTION

Figure 1:
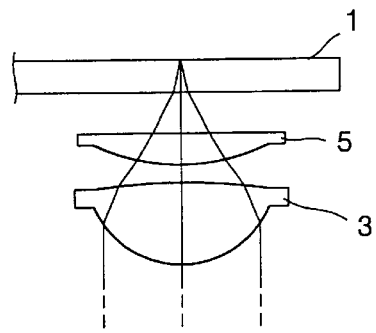
FIG. 1 is a schematic view of a conventional aberration correcting apparatus.

Reference will now be made in detail to the present preferred embodiments of the present invention, examples of which are illustrated in the accompanying drawings, wherein like reference numerals refer to like elements throughout.

Figure 2:
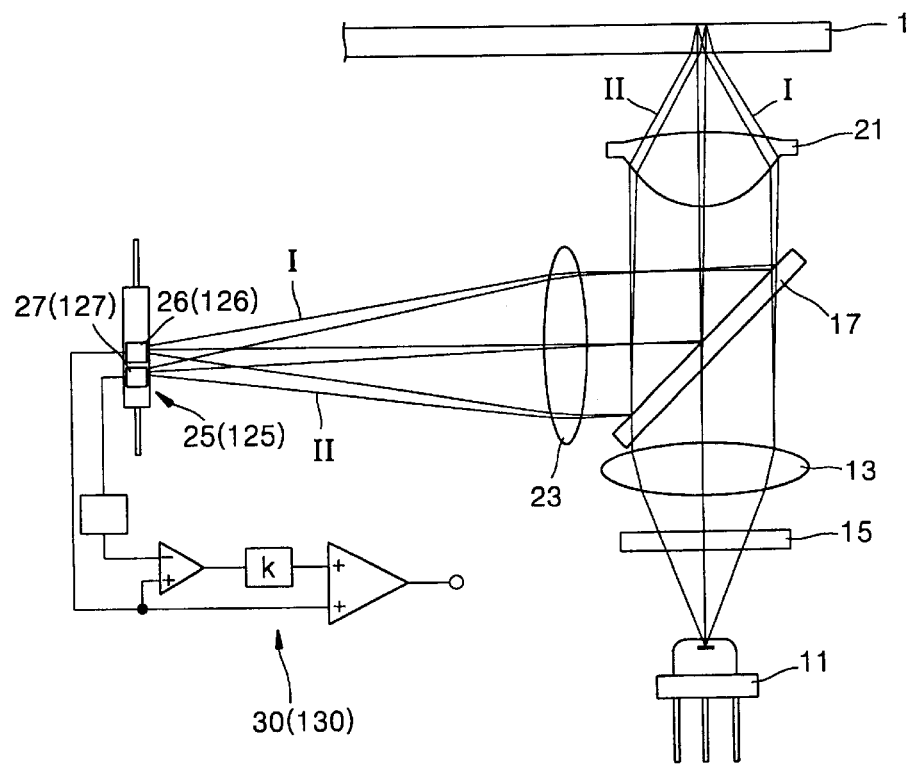
FIG. 2 is a schematic view illustrating the optical arrangement of an optical pickup according to an embodiment of the present invention.

An embodiment of an optical pickup according to the present invention is shown in FIG. 2. As shown in FIG. 2, the optical pickup includes a light source 11, light splitting means for splitting an incident beam to at least two beams to allow formation of at least two light spots on an optical disk 1, an optical path changing means for changing the traveling path of the beams reflected from the optical disk 1, an objective lens 21 focusing the incident beams on the optical disk 1, a photodetector 25/(or 125) receiving the light beams reflected from the optical disk 1, and a signal processor 30/(or 130) correcting for a thickness variation of the optical disk 1.

To increase the recording density of the optical disk 1 to hold about 15 gigabytes (GBs), a light source emitting short wavelength light of about 410 nm is adopted as the light source 11, and an objective lens having a numerical aperture (NA) of 0.6 or more is adopted as the objective lens 21.

Figure 3:
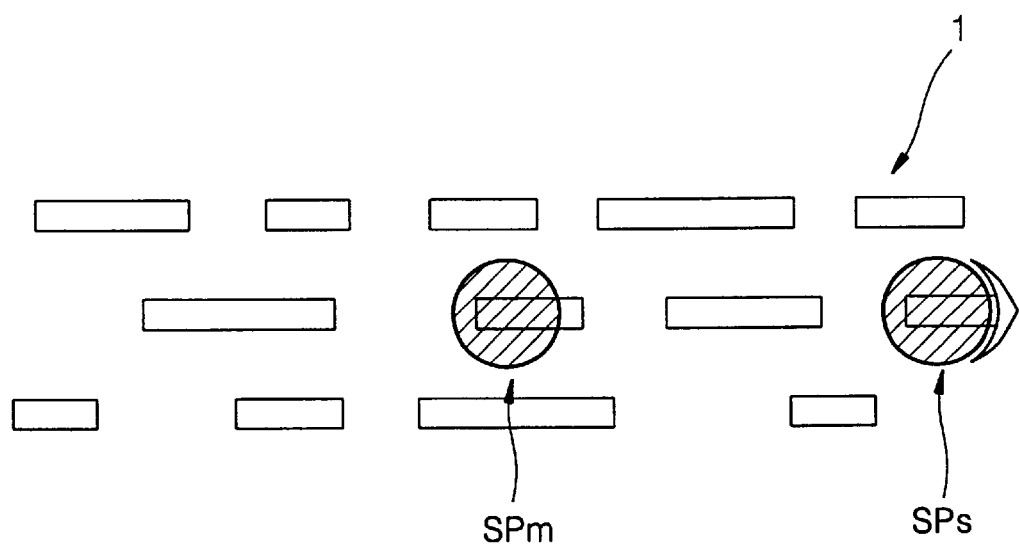
FIG. 3 illustrates a main light spot $SP_m$ and an auxiliary light spot $SP_s$ focused on an optical disk.
Figure 4:
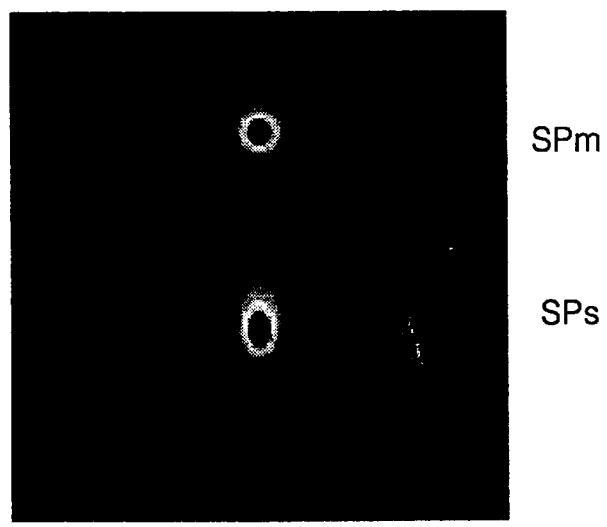
FIG. 4 illustrates the shapes of a main light spot $SP_m$ and an auxiliary light spot $SP_s$ when an optical disk is not tilted with respect to the optical axis.

A collimating lens 13 collimates the diverging beam from the light source 11 into a parallel beam. The light beam emitted from the light source 11 is split into at least two beams, a first beam I and a second beam II, by the light splitting means, and forms a main light spot $SP_m$ and an auxiliary light spot $SP_s$ on the optical disk 1, as shown in FIG. 3. The auxiliary light spot $SP_s$ includes coma aberration, which is intentionally caused for use in correcting for the tilt of the optical disk 1. When the optical disk 1 is not tilted with respect to the optical axis, the optical disk 1 is perpendicular to the optical axis, the first beam I is incident on the optical disk 1 and is parallel to the optical axis, while the second beam II is incident on the optical disk 1 at a predetermined angle. FIG. 4 illustrates the shapes of a main light spot $SP_{Pm}$ and an auxiliary light spot $SP_s$ when an optical disk is not tilted with respect to the optical axis. Accordingly, the first beam I forms the main light spot $SP_m$ without aberration, while the second beam II forms the auxiliary light spot $SP_s$ including a predetermined amount of coma aberration on the optical disk 1.

Figure 5:
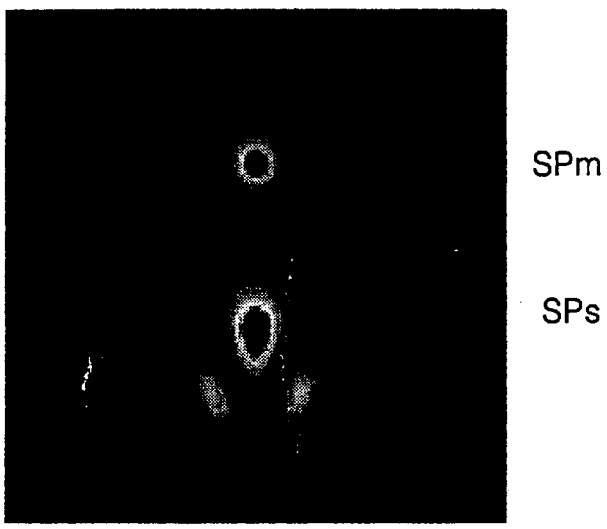
FIG. 5 illustrates the shapes of a main light spot $SP_m$ and an auxiliary light spot $SP_s$ when an optical disk is tilted at 0.5°.

When the optical disk 1 is tilted at a predetermined angle with respect to the optical axis, both the main light spot $SP_m$ and the auxiliary light spot $SP_s$ are distorted. As for the auxiliary light spot $SP_s$, the degree of distortion increases or decreases in the tilt direction of the optical disk 1. In particular, FIG. 5 illustrates the case where the optical disk 1 is arranged at a tilt angle of 0.5° in the same direction as the comma aberration of the auxiliary light spot $SP_s$. Accordingly, the distortion of the auxiliary light spot $SP_s$ is increased. Meanwhile, if the optical disk 1 is tilted in the opposite direction, the degree of distortion of the auxiliary light spot $SP_s$ decreases.

Based on the relationship between the main light spot $SP_m$ and the auxiliary light spot $SP_s$, coma aberration caused by the tilt of the optical disk 1 is corrected by the signal processor 30 that will be described later.

The light splitting means causes coma aberration only to the auxiliary light spot $SP_s$, without causing any aberration to the main light spot $SP_m$, when the optical disk 1 is arranged perpendicular to the optical axis, i.e., not tilted. For this purpose, a hologram optical element (HOE) 15 is employed as the light splitting means. The HOE 15 splits the incident beam into the first beam I and the second beam II, and passes the first beam I parallel to the optical axis and the second beam II at a predetermined angle with respect to the optical axis, thereby causing a predetermined amount of coma aberration only to the second beam II. Accordingly, the main light spot $SP_m$ and the auxiliary light spot $SP_s$ are focused on different positions along the same track of the optical disk 1.

Figure 6:
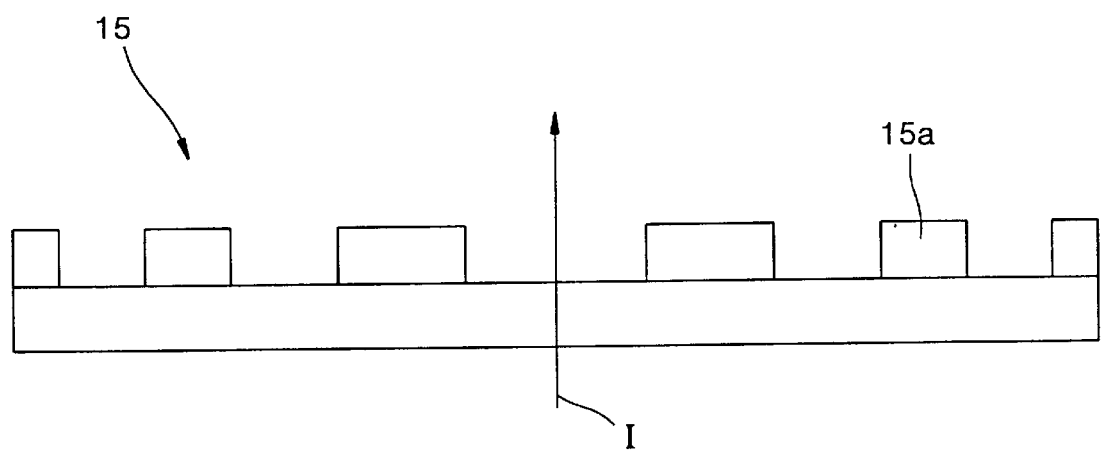
FIG. 6 is a sectional view of a hologram optical element (HOE) shown in FIG. 2.
Figure 7:
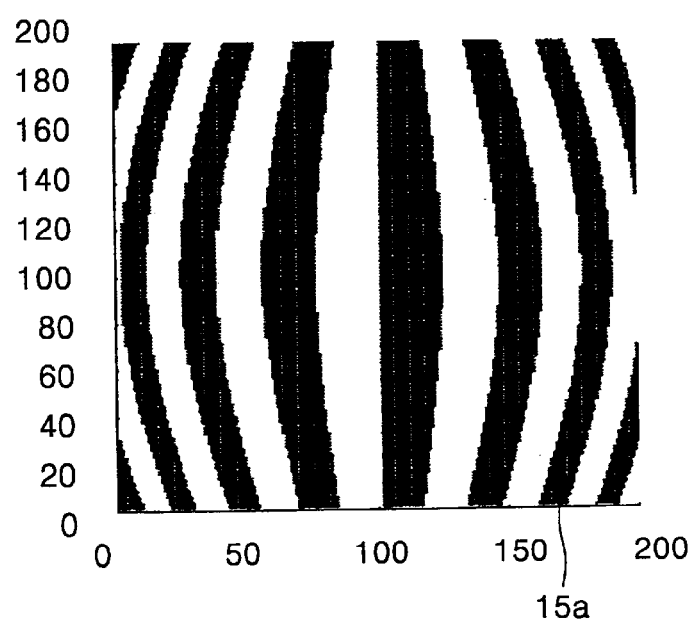
FIG. 7 is a plan view of the HOE shown in FIG. 2.

The HOE 15 is formed of an isotropic substrate with a hologram pattern 15a. An example of the hologram pattern 15a is shown in FIGS. 6 and 7. Referring to FIGS. 6 and 7, the hologram pattern 15a includes a series of curved strips with a predetermined degree of curvature, which are spaced more widely apart at the center region through which the first beam I passes, than at the peripheral region. The HOE 15 is designed to both divide and provide coma aberration to the incident light beam from the light source 11.

The optical path changing means is disposed along the optical path between the HOE 15 and the objective lens 21, and alters the traveling path of the beams reflected from the optical disk 1. In particular, the optical path changing means passes the incident beams from the light source 11 toward the objective lens 21, and the incident beams reflected from the optical disk 1 via the objective lens 21 toward the photodetector 25 (125). Preferably, a beam splitter 17, which splits incident beams by transmitting or reflecting the incident beams each in a predetermined ratio based on the amount of light, thereby changing the traveling path of the incident beams, is utilized as the optical path changing means.

The objective lens 21 focuses the first beam I and the second beam II, which have been split through the HOE 15, on the same track of the optical disk 1. In other words, the second beam II is focused on the same track of the optical disk 1 that the first beam I is focused on.

After having been reflected from the optical disk 1, the first and second beams I and II are condensed by a condensing lens 23, via the objective lens 21 and the beam splitter 17, and then received by the photodetector 25 (125).

Figure 8:
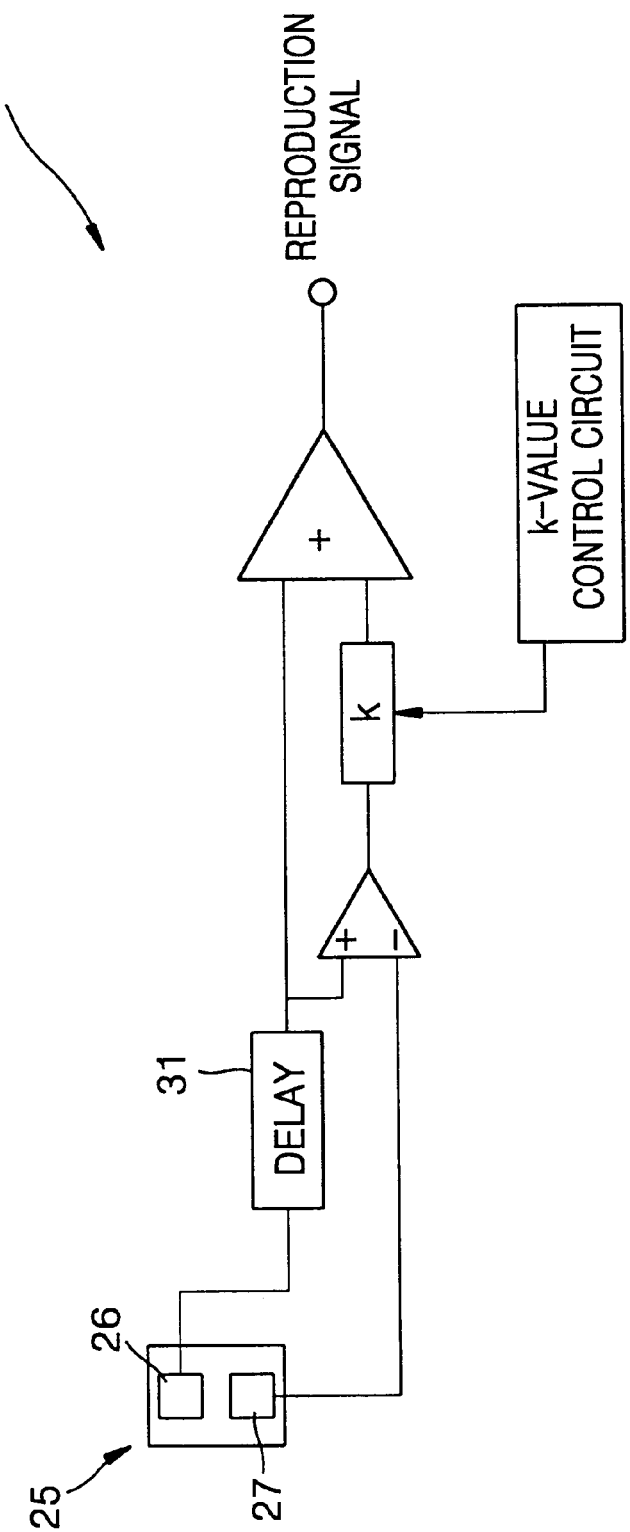
FIG. 8 is a schematic view showing an example of a photodetector and signal processor shown in FIG. 2.

Referring to FIGS. 2 and 8, an example of the photodetector 25 includes a first light receiving portion 26 and a second light receiving portion 27, which receive the first beam I and the second beam II, respectively, and perform photoelectric conversion. Also, the signal processor 30 corrects aberration caused by the tilt of the optical disk 1 with electrical signals obtained through photoelectric conversion by the first and second light receiving portions 26 and 27.

Referring to FIG. 8, the signal processor 30 corrects coma aberration caused by the tilt of the optical disk 1 according to the following formula (4), thereby producing a reproduction signal:

$$\text{Reproduction signal}=S_m+k(S_m-S_{sub}) \quad (4)$$

where $S_m$ represents a main reproduction signal that originates from the main light spot, which has been received and converted into an electrical signal by the first light receiving portion 26, $S_{sub}$ represents a sub reproduction signal that originates from the auxiliary light spot, which has been received and converted into an electrical signal by the second light receiving portion 27, and k is a gain factor. The gain factor k is varied depending on the degree of tilting of the optical disk, and has a positive or negative value according to the tilt direction. The gain factor k is varied by a k-value control circuit, in proportion to the amplitude of a tilt signal detected by a sensor that detects the tilt of the optical disk 1, or according to the amount of jitter, which has been monitored so as to minimize jitter of the reproduction signal.

A delay 31 of the signal processor 30, if the optical signals received by the first and second light receiving portions 26 and 27 have a phase difference, delays the phase of the leading signal so as to match the phases of the two signals. Thus, if there is no phase difference between the two signals received by the first and second light receiving portions 26 and 27, the delay 31 can be excluded from the signal processor 30.

Figure 9:
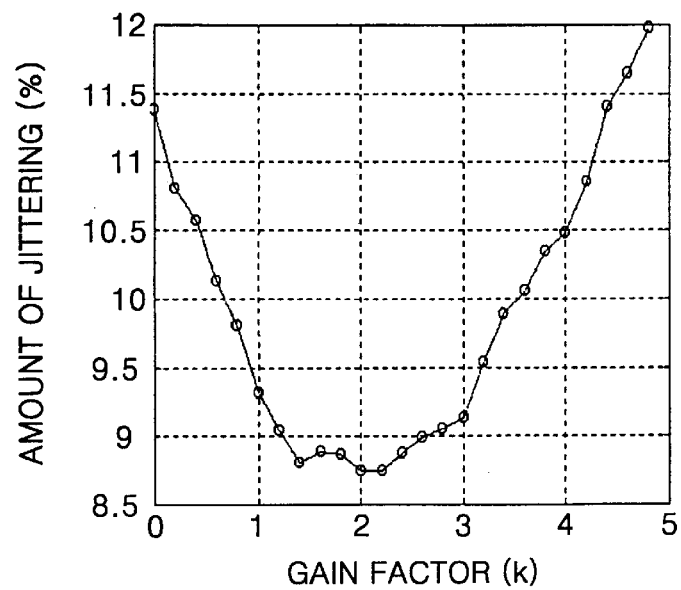
FIG. 9 is a graph illustrating the amount of corrected jitter with respect to gain factor k at a tilt angle of 0.25°.

The correction of jitter in a reproduction signal by the signal processor 30 will be described with reference to FIG. 9. FIG. 9 is a graph showing the amount of corrected jitter with respect to gain factor k when the optical disk has a tangential tilt angle of 0.25°. For this case, the NA of the objective lens is 0.6, the wavelength of light emitted from the light source is 400 nm, the track pitch is 0.37 $\mu$m, the minimum mark length is 0.25 $\mu$m, and the modulation code $EFM^+$ is applied.

As shown in FIG. 9, the amount of jitter decreases from 11.4% before correction (k=0) to 8.7% at k=2 after correction, which is close to the jitter of 8.3% when the optical disk is not tilted.

Figure 10:
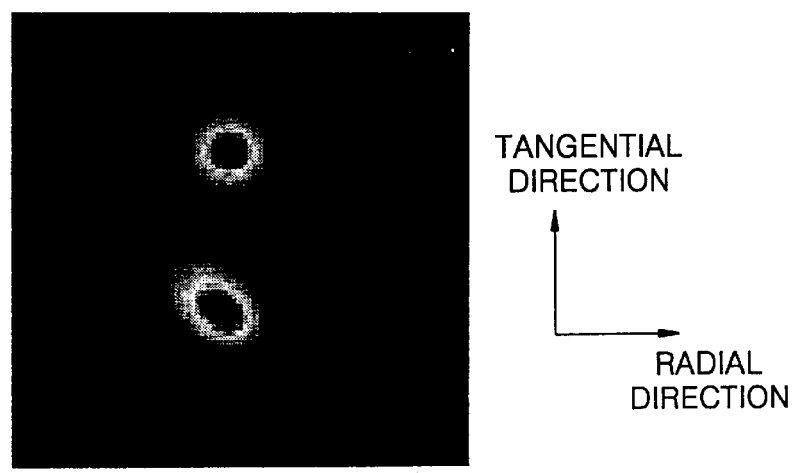
FIG. 10 illustrates an auxiliary light spot distorted in both tangential and radial directions of an optical disk.

Meanwhile, the correction for radial tilting of the optical disk can be accomplished by patterning the HOE to introduce coma aberration into the auxiliary light spot in the radial direction. If the HOE is patterned to cause coma aberration to the auxiliary light spot $SP_s$ in both tangential and radial directions, as shown in FIG. 10, it is possible to simultaneously correct coma aberration caused by the tilting of the optical disk 1 in the radial and tangential directions.

Figure 11:
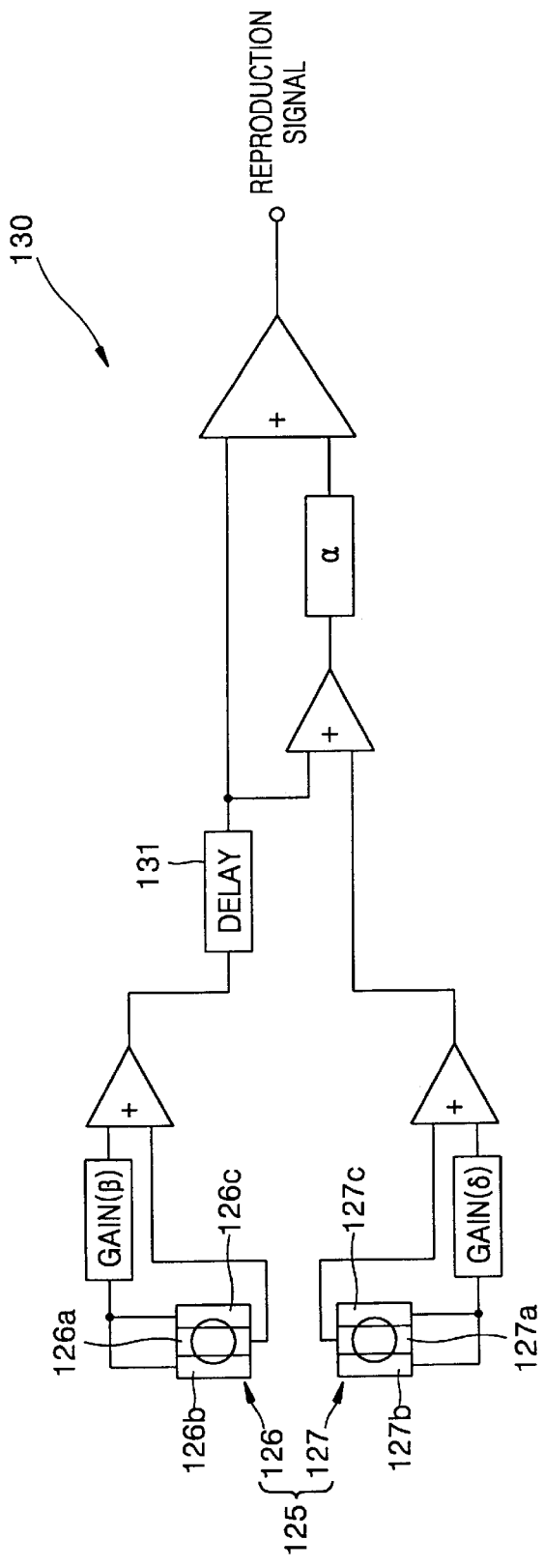
FIG. 11 is a schematic view of another example of the photodetector and signal processor shown in FIG. 2.

Another example of a photodetector is the photodetector 125 shown in FIG. 11. Referring to FIG. 11, the photodetector 125 shown in FIG. 11 includes the first and second light receiving portions 126 and 127 receiving the first and second beams I and II, respectively. In this case, the first light receiving portion 126 has a plurality of sub light receiving areas separately receiving peripheral light and central light of the first beam I. The second light receiving portion 127 also has a plurality of sub-light receiving areas separately receiving peripheral light and central light of the second beam II.

The first light receiving portion 126 may include a first light receiving area 126a receiving and detecting a signal from central light of the first beam I, and second and third light receiving areas 126b and 126c arranged at both sides of the first light receiving area 126a in the radial direction of the optical disk 1, receiving and detecting a signal from the peripheral light of the first beam I. The signal from the "peripheral" light refers to the signal detected from light around central light in the radial direction of the optical disk 1.

The second light receiving portion 127 includes a fourth light receiving area 127a receiving and detecting a signal from central light of the second beam II, and fifth and sixth light receiving areas 127b and 127c arranged at both sides of the fourth light receiving area 127a in the radial direction of the optical disk 1, receiving and detecting a signal from the peripheral light of the second beam II.

The signals received by the first and second light receiving portions 126 and 127 are converted into electrical signals, and aberration caused by the tilting of the optical disk 1, and crosstalk of the electrical signals are corrected by the signal processor 130.

Figure 12:
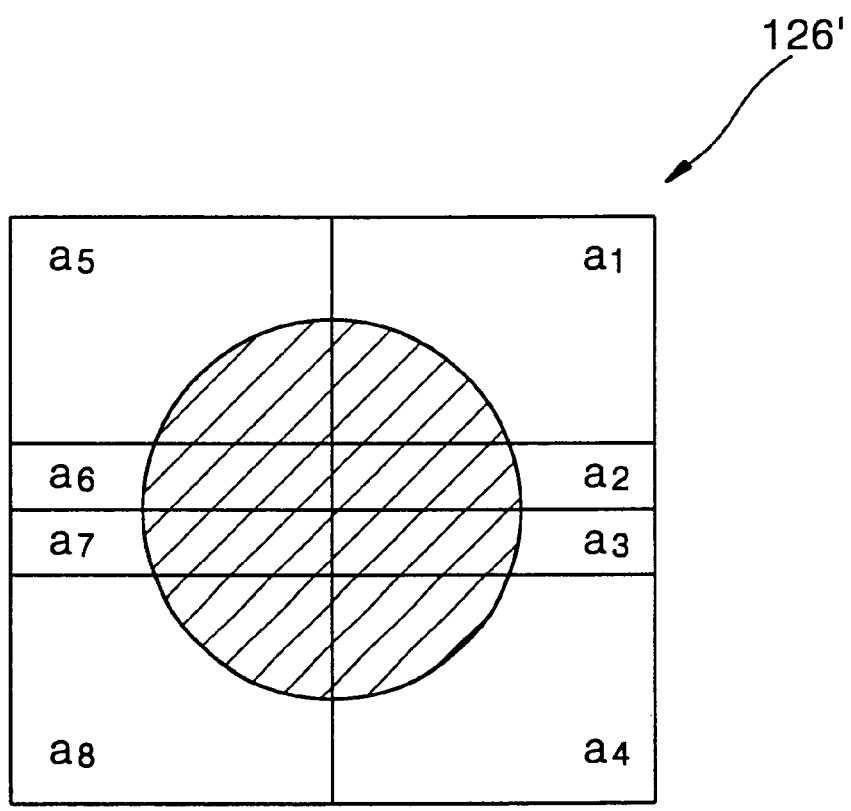
FIG. 12 is a schematic view illustrating a modification of the first light receiving portion of the photodetector shown in FIG. 11.

Alternatively, the divided structure of the first light receiving portion 126 can be modified as shown in FIG. 12, which enables the detection of a tracking error signal. Referring to FIG. 12, a first light receiving portion 126' has 8 areas $a_1$ through $a_8$ in a 4×2 array. In particular, the first light receiving portion 126' is divided into four in the radial direction of the optical disk 1, and into two in the tangential direction of the optical disk 1. The four areas $a_2$, $a_3$, $a_6$ and $a_7$, which are located in the middle of the first light receiving portion 126', receive central light of the first beam I, while the remaining four areas $a_1$, $a_4$, $a_5$ and $a_8$, receive peripheral light of the first beam I.

When intended to detect a tracking error signal, the first light receiving portion 126' detects the tracking error signal with fourth areas $(a_1+a_2)$, $(a_3+a_4)$, $(a_5+a_6)$ and $(a_7+a_8)$, i.e., by combining the eight areas $a_1$ through $a_8$ into groups of two, which are approximately the same as a common photodetector including just four areas. When intended to reduce crosstalk, the eight areas are combined into three areas, $(a_1+a_5)$, $(a_2+a_6+a_3+a_7)$ and $(a_4+a_8)$, and the signals received through the three areas are processed by the signal processor 130 shown in FIG. 11. This will be described below.

Turning back to FIG. 11, the signal processor 130 corrects optical aberration caused by the tilting of the optical disk 1, and crosstalk, using the electrical signals that have been received and have undergone photoelectric conversion by the first and second light receiving portions 126 and 127.

The signal processor 130 processes the electrical signals using formula (5) to produce a reproduction signal, thereby correcting coma aberration caused by the tilting of the optical disk 1:

$$\text{Reproduction signal} = S_m + \alpha(S_m - S_{sub}) \quad (5)$$

where $S_m$ represents a main reproduction signal that originates from the main light spot, which has been received and converted into an electrical signal by the first light receiving portion 126, $S_{sub}$ represents a sub-reproduction signal that originates from the auxiliary light spot, which has been received and converted into an electrical signal by the second light receiving portion 127, and $\alpha$ is a gain factor.

In the present embodiment, the main reproduction signal $S_m$ detected by the first light receiving portion 126 is a sum signal of the signal from the central light of the first beam I detected by the first light receiving area 126a, and the product of the signal from the peripheral light of the first beam I detected by the second and third light receiving areas 126b and 126c and a gain factor β that is varied to minimize crosstalk caused by neighboring tracks of the optical disk 1.

The sub-reproduction signal $S_{sub}$ detected by the second light receiving portion 127 is a sum signal of the signal from central light of the second beam II detected by the fourth light receiving area 127a, and the product of the signal from peripheral light of the second beam II detected by the fifth and sixth light receiving areas 127b and 127c, and a gain factor δ that is varied to minimize crosstalk caused by neighboring tracks of the optical disk 1.

As previously mentioned, both the first and second light receiving portions 126 and 127 detect signals from central light and peripheral light, separately, and then multiply peripheral light signals by a predetermined gain factor β or δ, thereby reducing the effect of crosstalk from adjacent tracks of the optical disk 1 which has a narrow track pitch.

As shown in FIG. 11, a delay 131 of the signal processor 130, if the signals detected by the first and second light receiving portions 126 and 127 have a phase difference, delays the phase of the leading signal to match the phases of the two signals. Thus, if there is no phase difference between the two signals received by the first and second light receiving portions 126 and 127, the delay 131 can be excluded from the signal processor 130.

Figure 13:
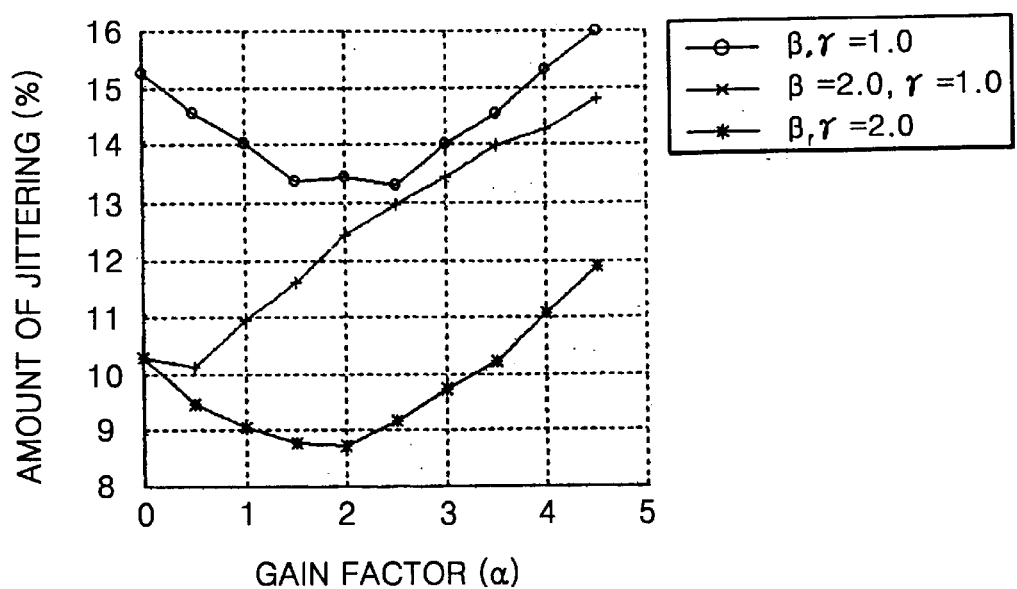
FIG. 13 is a graph illustrating the amount of corrected jitter with respect to different gain factors α, β and δ at a tilt angle of 0.25°.

The correction of jitter in a reproduction signal by the signal processor 130 will be described with reference to FIG. 13. FIG. 13 is a graph showing the amount of corrected jitter with respect to the gain factor α when the optical disk has a tangential tilt angle of 0.25°. For this case, the NA of the objective lens is 0.6, the wavelength of light emitted from the light source is 400 nm, the track pitch is 0.37 μm, the minimum mark length is 0.25 μm, and the modulation code EFM⁺ is applied. The other gain factors β and 67 are set to 2.0.

As shown in FIG. 13, comparing the case where β=1.0 and δ=1.0 (no correction) with the case where β=2.0 and δ=2.0, the amount of jitter is reduced from 15.5% before correction to 10.3% after correction. In addition, when gain factor α is optimized at 2.0, the amount of jitter is improved from 13.5% to 8.8%. When crosstalk is corrected with respect to only light received by the first light receiving portion 126, not to light received by the second light receiving portion 127 (β=2.0 and δ=1.0), the amount of jitter is reduced to 10.2% when gain factor α is 0.5.

Meanwhile, the correction of radial tilting of the optical disk can also be accomplished by patterning the HOE to introduce coma aberration into the auxiliary light spot in the radial direction in the present embodiment. If the HOE is patterned to cause coma aberration to the auxiliary light spot $SP_s$ in both tangential and radial directions, it is possible to simultaneously correct coma aberration caused by the tilting of the optical disk 1 in the radial and tangential directions.

Figure 14:
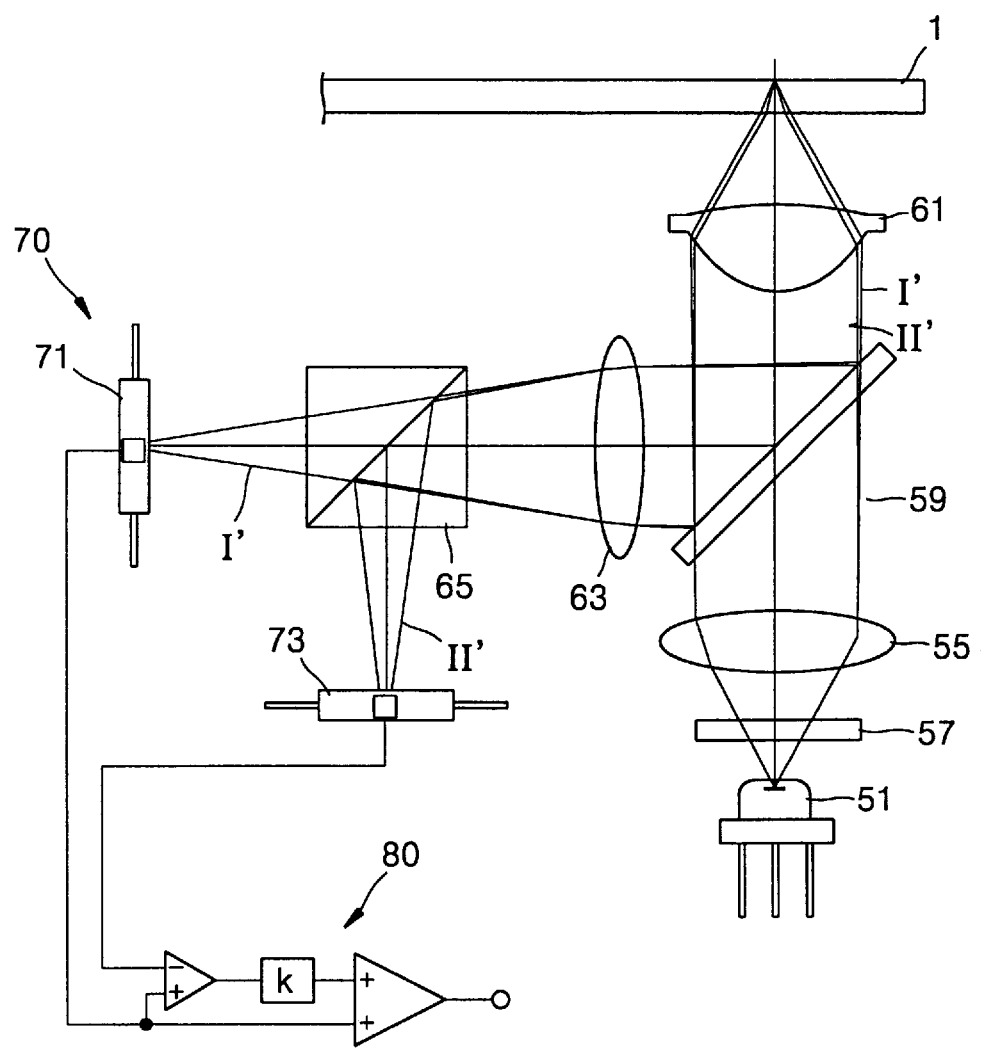
FIG. 14 is a schematic view illustrating the optical arrangement of an optical pickup according to another embodiment of the present invention.

Another embodiment of an optical pickup according to the present invention is shown in FIG. 14. Referring to FIG. 14, the optical pickup includes a light source 51, light splitting means for splitting an incident beam to allow formation of at least two light spots on an optical disk 1, optical path changing means for changing the traveling path of the incident beams, an objective lens 61 focusing the incident beams on the optical disk 1, a photodetector 70 receiving the light beams reflected from the optical disk 1, and a signal processor 80 correcting for the thickness variations of the optical disk 1. In the present embodiment, the light source 51 and the objective lens 61 are substantially the same as the light source 11 and the objective lens 21, respectively, which were described with reference to FIG. 3, and thus a description thereof is omitted.

Diverging light emitted from the light source 51 is split into at least two light beams, first beam I' and second beam II', by the light splitting means. The first and second beams I' and II' are focused by the objective lens 61 to form a main light spot without aberration and an auxiliary light spot including a predetermined amount of coma aberration, respectively, on the optical disk 1. The first and second beams I' and II' are focused in the same position on the optical disk 1, but can be distinguished from each other by polarization direction.

For this case, preferably, the light splitting means includes a polarization HOE 57 for causing a predetermined amount of coma aberration only to the second beam II' having a polarized component, not to the first beam I' having the other polarized component. The polarization HOE 57 has a hologram pattern, which is substantially the same as that of the HOE 15 described with reference to FIGS. 6 and 7, and thus a description of the hologram pattern of the polarization HOE 57 is omitted. However, the dimensions of the hologram pattern such as the curvature of the stripes, the widths of the stripes, and the gaps between the stripes, etc., are slightly different in each HOE. In contrast to the HOE 15, the HOE 57 is designed to only provide coma aberration to the incident light beam from the light source 51, and does not divide the light beam.

The optical path changing means includes a beam splitter 59 changing the traveling path of the incident beams by transmitting or reflecting the incident beams each in a predetermined ratio, which is disposed along the optical path between the polarization HOE 57 and the objective lens 61, and a polarization beam splitter 65 changing the traveling path of the incident beams by transmitting or reflecting the incident beams according to their polarization components, which is disposed along the optical path between the beam splitter 59 and the photodetector 70. In this case, a condensing lens 63 condensing the incident beams may be further arranged between the beam splitter 59 and the polarization beam splitter 65.

The photodetector 70 has first and second light receiving portions 71 and 73 which are separated from each other, as shown in FIG. 14, to receive the first and second beams I' and II', which have been split through the polarization beam splitter 65. The first beam I' having one polarization component is received by the first light receiving portion 71, while the second beam II' having the other polarization component is received by the second light receiving portion 73.

The signal processor 80 corrects aberration caused by the tilting of the optical disk 1 using the electrical signals, which have been converted from the optical signals received by the first and second light receiving portions 71 and 73 of the photodetector 70.

The photodetector 70 and the signal processor 80 are substantially the same, respectively, as the photodetector 25 and the signal processor 30 described with reference to FIG. 8, or the photodetector 125 and the signal processor 130 described with reference to FIGS. 11 and 12, and thus a description of the photodetector 70 and the signal processor 80 is omitted.

The effect of the optical pickup having the above configuration in correcting aberration and improving focus will be described with reference to FIGS. 15 through 22.

Figure 15:
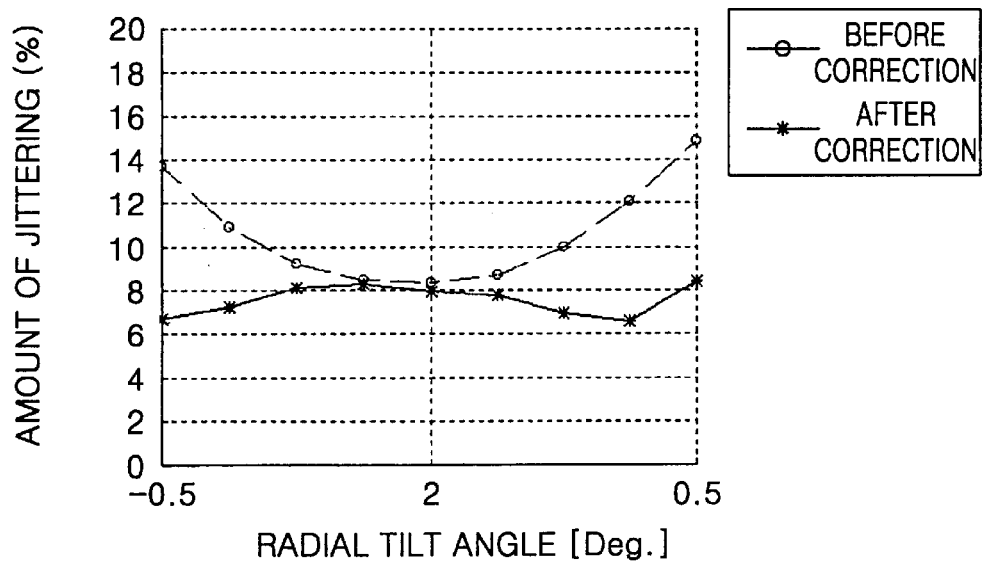
FIGS. 15 and 16 are graphs illustrating the variation of jitter before and after correction with respect to the tilt angles, and the optimum gain factor k for various tilt angles, respectively.
Figure 16:
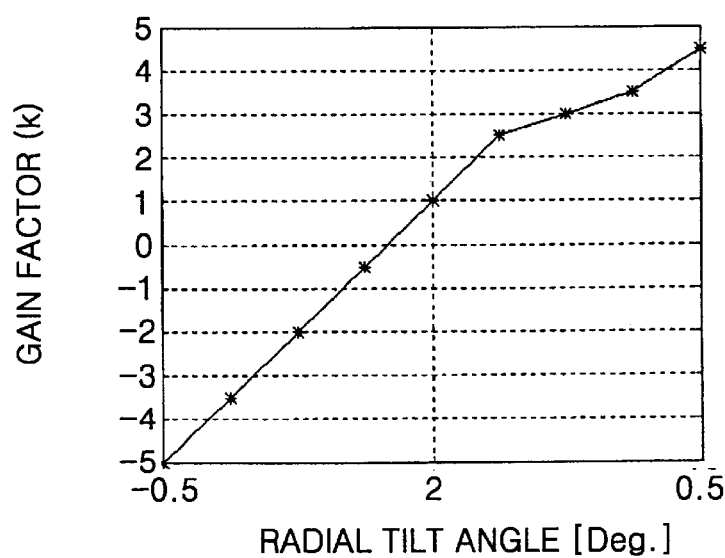

First of all, FIGS. 15 through 20 are for the case where the photodetector 70 and the signal processor 80 are designed in a similar way as the photodetector 25 and the signal processor 30, respectively, described with reference to FIG. 8. In particular, FIG. 15 illustrates the jitter variations before and after aberration with respect to the tilt angle of the optical disk in the radial direction. As shown in FIG. 15, the amount of jitter sharply decreases after aberration correction. The aberration correction is optimized at each tilt angle by adjusting the gain factor k. FIG. 16 shows the optimum gain factor k for aberration correction at various tilt angles of the optical disk. Although not illustrated, when the optical disk is tilted in the tangential direction, or in the diagonal direction between the tangential and radial directions, coma aberration can be corrected by adjusting the gain factor k, thereby sharply reducing the amount of jitter.

Figure 17:
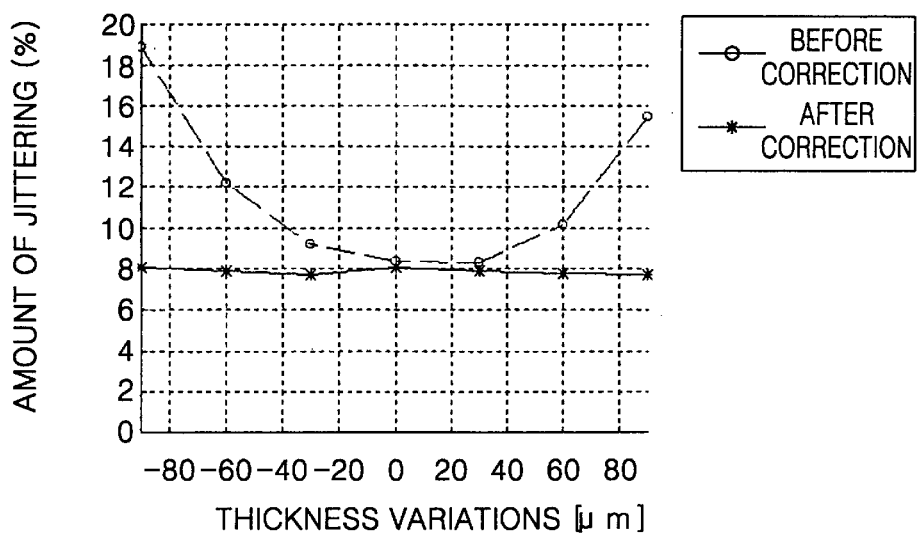
FIGS. 17 and 18 are graphs illustrating the variation of jitter before and after correction with respect to the thicknesses of optical disks, and the optimum gain factor k for various thicknesses, respectively.
Figure 18:
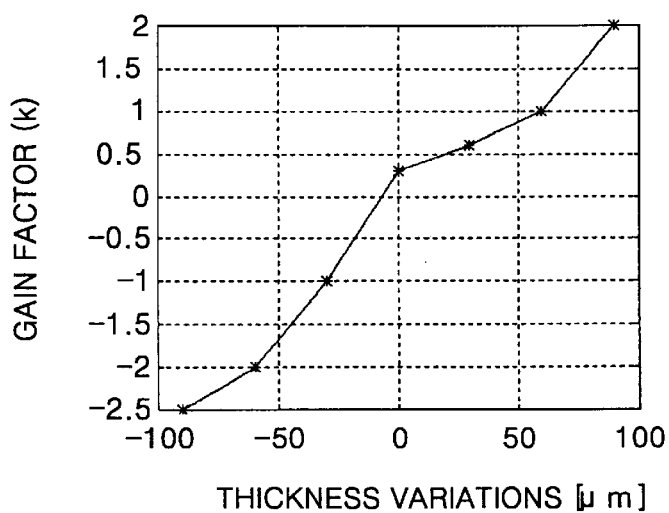

FIG. 17 illustrates the jitter variations before and after aberration correction with respect to the thickness variations of the optical disk, and FIG. 18 shows the optimum gain factor k for aberration correction at various thicknesses of the optical disk. As shown in FIGS. 17 and 18, the jitter properties can be highly improved by adjusting the gain factor k depending on the thickness variations of the optical disks.

Figure 19:
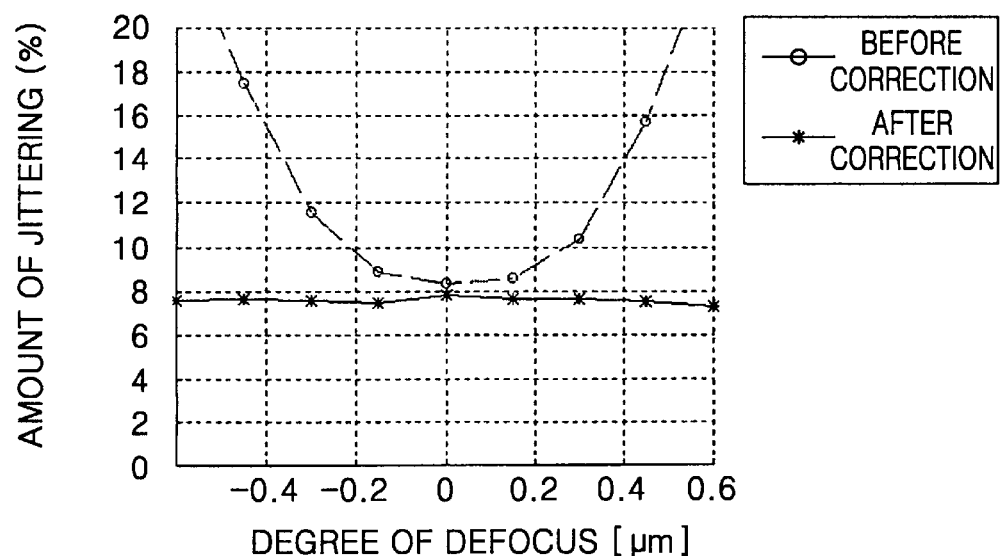
FIGS. 19 and 20 are graphs illustrating the variations of jitter before and after correction with respect to the degree of defocus, and the optimum gain factor k for various degrees of defocus.
Figure 20:
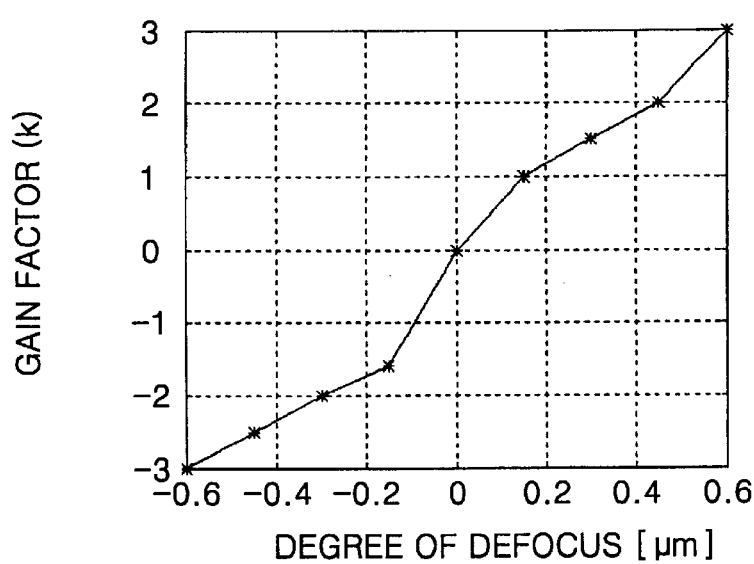

FIG. 19 illustrates the jitter variations before and after aberration correction with respect to the degree of defocus on the optical disc, and FIG. 20 shows the optimum gain factor k for aberration correction with respect to the degree of defocus on the optical disk. As shown in FIGS. 19 and 20, the jitter properties can be largely improved by adjusting the gain factor k depending on the degree of defocus.

Figure 21:
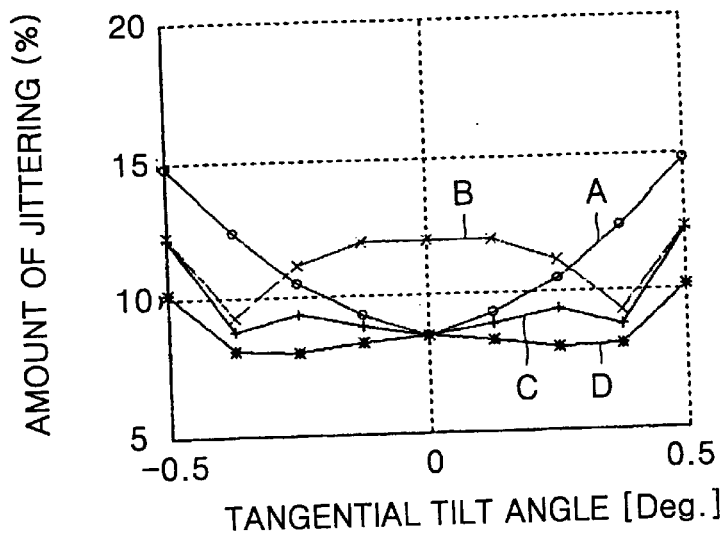
FIG. 21 is a graph illustrating the tangential tilt correction effect when the optical pickup shown in FIG. 14 adopts the photodetector and signal processor shown in FIG. 11.
Figure 22:
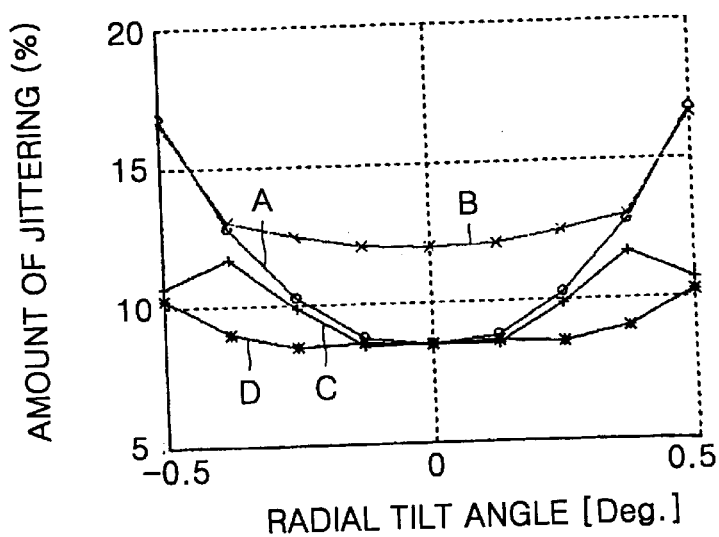
FIG. 22 is a graph illustrating the radial tilt correction effect when the optical pickup shown in FIG. 14 adopts the photodetector and signal processor shown in FIG. 11.

On the other hand, FIGS. 21 and 22 are for the case where the photodetector 70 and the signal processor 80 are designed in a similar way as the photodetector 125 and the signal processor 130, respectively, described with reference to FIGS. 11 and 12, so as to correct crosstalk as well as aberration. In particular, FIGS. 21 and 22 illustrate the jitter variations after aberration and/or crosstalk correction when the optical disk is tilted in the tangential and radial directions, respectively. In FIGS. 21 and 22, plot A indicates the case where only a main light spot is formed, plot B indicates the case where aberration caused by the tilting of the optical disk is corrected using an auxiliary light spot and no crosstalk is corrected by the signal processor, and plot C indicates the case where aberration is corrected using an auxiliary light spot, and crosstalk correction is performed with respect to only the signal received by the first light receiving portion, not the signal received by the second light receiving portion. Plot D indicates the case where aberration is corrected using an auxiliary light spot, and crosstalk correction is performed with respect to the signals received by both the first and second light receiving portions.

As shown in FIGS. 21 and 22, when aberration is corrected using two light spots, and a predetermined gain factor is considered for central and peripheral light, separately, by adopting the first and second light receiving portions divided into a plurality of light receiving areas, which corresponds to the case of plot D, jitter is sharply reduced when the optical disk is tilted in both the tangential and radial directions.

As previously mentioned, a first beam without including aberration and a second beam including coma aberration are focused into a main light spot and an auxiliary light spot, respectively on an optical disk, and then detected by first and second light receiving portions, respectively, of a photodetector. Next, the detected signals are processed by formula (4) to produce a reproduction signal. As a result, coma aberration caused by tilting of the optical disk and spherical aberration caused by thickness variations of optical disks can be corrected, thereby reducing jitter and improving focus of the reproduction signal.

Also, a reproduction signal can be obtained by correcting crosstalk, and coma aberration caused by tilting of the optical disk, and spherical aberration caused by thickness variations of optical disks, using formula (5) with a photodetector whose two light receiving portions are further divided into light receiving areas, thereby resulting in further reduction of jitter.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. An optical pickup used with an optical disk, comprising:
   a light source emitting a light beam;
   light splitting means for splitting the light beam into at least two light beams including a first beam and a second beam;
   optical path changing means for changing a traveling path of the first and second beams reflected from the optical disk;
   an objective lens focusing the first and second beams to form a main light spot and an auxiliary light spot, respectively, on the optical disk;
   a photodetector having first and second light receiving portions receiving the first and second beams reflected from the optical disk and passed through the optical path changing means, respectively, and performing photoelectric conversion on the received first and second beams to produce electrical signals; and
   a signal processor correcting aberration caused by tilting of the optical disk, using the electrical signals,
   wherein:
      the light splitting means comprises a polarization beam splitter causing a predetermined amount of coma aberration only to the second beam, not to the first beam, such that the first beam has a polarization component without aberration, and the second beam has the other polarization component including coma aberration; and
      the optical path changing means comprises:
      a beam splitter changing the traveling path of the first and second beams by transmitting or reflecting the first and second beams each in a predetermined ratio based on an amount of light, and
      a polarization beam splitter disposed along an optical path between the beam splitter and the photodetector, transmitting or reflecting the first and second beams reflected from the optical disk and passed through the beam splitter according to polarization;
   wherein the first and second light receiving portions of the photodetector are arranged separated from each other to receive the first and second beams passed through the polarization beam splitter, respectively.

2. An optical pickup used with an optical disk, comprising:
   a light source emitting a light beam;
   light splitting means for splitting the light beam into at least two light beams including a first beam and a second beam;
   optical path changing means for changing a traveling path of the first and second beams reflected from the optical disk;
   an objective lens focusing the first and second beams to form a main light spot and an auxiliary light spot, respectively, on the optical disk;
   a photodetector having first and second light receiving portions receiving the first and second beams reflected from the optical disk and passed through the optical path changing means, respectively, and performing photoelectric conversion on the received first and second beams to produce electrical signals; and
   a signal processor correcting aberration caused by tilting of the optical disk, using the electrical signals,
   wherein the first light receiving portion generates a main reproduction signal $S_m$ from the first beam which forms the main light spot, the second light receiving portion generates a sub-reproduction signal $S_{sub}$ from the second beam which forms the auxiliary light spot, and k is a gain factor, the signal processor producing a reproduction signal using the following formula, thereby correcting the aberration caused by the tilting of the optical disk:

Reproduction signal=$S_m+K(S_m-S_{sub})$.

3. The optical pickup of claim 2, wherein the signal processor further comprises a k-value control circuit adjusting the gain factor k to be optimized according to an amount of optical aberration to be corrected.

4. The optical pickup of claim 2, wherein the signal processor further comprises a delay circuit matching phases of the main light spot and the auxiliary light spot if the main light spot and the auxiliary light spot have a phase difference.

5. An optical pickup used with an optical disk, comprising:
   a light source emitting a light beam;
   light splitting means for splitting the light beam into at least two light beams including a first beam and a second beam, wherein one of the first and second beams includes optical aberration;
   optical path changing means for changing a traveling path of the first and second beams reflected from the optical disk;
   an objective lens focusing the first and second beams to form a main light spot and an auxiliary light spot, respectively, on the optical disk;
   a photodetector having first and second light receiving portions for receiving the first and second beams ref from the optical disk and passed through the optical path changing means, respectively, the first and second light receiving portions each including a plurality of light receiving areas receiving and photoelectrically converting central light and peripheral light, separately, of the first and second beams to generate electrical signals; and
   a signal processor correcting crosstalk and aberration caused by tilting and thickness variation of the optical disk based upon the electrical signals.

6. The optical pickup of claim 5, wherein the first light receiving portion generates a main reproduction signal $S_m$ from the first beam which forms the main light spot, the second light receiving portion generates a sub-reproduction signal $S_{sub}$ from the second light beam which forms the auxiliary light spot, and α is a gain factor, the signal processor producing a reproduction signal using the following formula, thereby correcting the aberration caused by the tilting of the optical disk:

Reproduction signal=$S_m+\alpha(S_m-S_{sub})$.

7. The optical pickup of claim 6, wherein the first light receiving portion generates the main reproduction signal $S_m$ by summing a signal detected from the central light of the first beam by one of the light receiving regions thereof, and the product of a signal detected from the peripheral light of the first beam by the other light receiving regions thereof and a gain factor β which minimizes crosstalk from neighboring tracks of the optical disk.

8. The optical pickup of claim 7, wherein the first light receiving portion comprises the one light receiving area as a first light receiving area detecting the signal from the central light of the first beam, and the other light receiving area thereof comprise second and third light receiving areas formed at either side of the first light receiving area in a radial direction of the optical disk, detecting the signal from the peripheral light of the first beam.

9. The optical pickup of claim 6, wherein the second light receiving portion generates the sub-reproduction signal $S_{sub}$ by summing a signal detected from the central light of the second beam by one of the sub-light receiving regions thereof, and the product of a signal detected from the peripheral light of the second beam by the other light receiving areas thereof and a gain factor δ which minimizes crosstalk from neighboring tracks of the optical disk.

10. The optical pickup of claim 9, wherein the second light receiving portion comprises the one light receiving area as a first light receiving area detecting the signal from the central light of the second beam, and the other light receiving areas comprise second and third light receiving areas formed at either side of the first light receiving area in a radial direction of the optical disk, detecting the signal from peripheral light of the second beam.

11. The optical pickup of claim 8, wherein the second light receiving portion generates the sub-reproduction signal $S_{sub}$ by summing a signal detected from the central light of the second beam by one of the sub-light receiving regions thereof, and the product of a signal detected from the peripheral light of the second beam by the other light receiving areas thereof and a gain factor δ which minimizes crosstalk from neighboring tracks of the optical disk.

12. The optical pickup of claim 11, wherein the second light receiving portion comprises the one light receiving area as a fourth light receiving area detecting the signal from the central light of the second beam, and the other light receiving areas comprise fifth and sixth light receiving areas formed at either side of the first light receiving area in a radial direction of the optical disk, detecting the signal from peripheral light of the second beam.

13. The optical pickup of claim 5, wherein the light splitting means comprises a hologram optical element (HOE) causing a predetermined amount of coma aberration to only the second beam, not to the first beam, such that the main light spot without aberration and the auxiliary light spot including coma aberration are focused when the optical disk is not tilted.

14. The optical disk of claim 5, wherein:
the light splitting means comprises a polarization beam splitter causing a predetermined amount of coma aberration only to the second beam, not to the first beam, such that the first beam has a polarization component without aberration, and the second beam has the other polarization component including coma aberration: and
wherein the optical path changing means comprises
a beam splitter changing the traveling path of the first and second beams by transmitting or reflecting each of the first and second beams in a predetermined ratio based on an amount of light, and a polarization beam splitter disposed along an optical path between the beam splitter and the photodetector, transmitting or reflecting the first and second beams reflected from the optical disk and passed through the beam splitter according to polarization, wherein the first and second light receiving portions of the photodetector are arranged separated from each other to receive the first and second beams passed through the polarization beam splitter, respectively.

15. An optical pickup used with an optical disk, comprising:
a light source emitting a light beam;
a light splitter which splits the light beam into first and second beams;
an optical element which focuses the first and second beams onto an optical disk and directs the first and second beams reflected from the optical disk; and
a photoreceiver which corrects aberration caused by tilting of the optical disk based upon the reflected first and second light beams,
wherein the photoreceiver comprises:
first and second light receiving portions respectively receiving the directed first and second light beams, wherein the first light receiving portion generates a main reproduction signal $S_m$ from the first beam, and the second light receiving portion generates a sub-reproduction signal $S_{sub}$ from the second light beam; and
a signal processor producing a reproduction signal using the following formula where k is a gain factor, thereby correcting the aberration caused by the tilting of the optical disk:

$$\text{Reproduction signal} = S_m + k(S_m - S_{sub}).$$

16. The optical pickup of claim 15, wherein the signal processor comprises a k-value control circuit which varies the gain factor k in proportion to an amplitude of a tilt signal indicative of the tilt of the optical disk or according to an amount of jittering which has been monitored to minimize the jittering of the reproduction signal.

17. The optical pickup of claim 16, further comprising a sensor to detect the tilt of the optical disk and generate the tilt signal in response thereto.

18. The optical pickup of claim 15, wherein the signal processor comprises a delay which delays a leading one of the main reproduction signal $S_m$ and the sub-reproduction signal $S_{sub}$ generated by the first and second light receiving portions to match phases of the main reproduction signal $S_m$ and the sub-reproduction signal $S_{sub}$.

19. An optical pickup used with an optical disk, comprising:
a light source emitting a light beam;
a light splitter which splits the light beam into first and second beams;
an optical element which focuses the first and second beams onto an optical disk and directs the first and second beams reflected from the optical disk; and
a photoreceiver which corrects aberration caused by tilting of the optical disk based upon the reflected first and second light beams,
wherein the photoreceiver comprises:
first and second light receiving portions respectively receiving the directed first and second light beams, the first and second light receiving portions each including a plurality of light receiving areas receiving and photoelectrically converting central light and peripheral light, separately, of the first and second beams to generate electrical signals; and
a signal processor correcting the aberration caused by the tilting of the optical disk based upon the electrical signals.

20. The optical pickup of claim 19, wherein the signal processor corrects crosstalk of the optical disk based upon the electrical signals.

21. The optical pickup of claim 19, wherein the first light receiving portion generates a main reproduction signal $S_m$ from the first beam, the second light receiving portion generates a sub-reproduction signal $S_{sub}$ from the second light beam, and the signal processor produces a reproduction signal using the following formula where $\delta$ is a gain factor, thereby correcting the aberration caused by the tilting of the optical disk:

$$\text{Reproduction signal}=S_m+\alpha(S_m-S_{sub}).$$

22. The optical pickup of claim 21, wherein the first light receiving portion generates the main reproduction signal $S_m$ by summing a signal detected from the central light of the first beam by one of the light receiving regions thereof, and the product of a signal detected from the peripheral light of the first beam by the other light receiving regions thereof and a gain factor $\beta$ which minimizes crosstalk from neighboring tracks of the optical disk.

23. The optical pickup of claim 22, wherein the first light receiving portion comprises the one light receiving area as a first light receiving area detecting the signal from the central light of the first beam, and the other light receiving areas thereof comprise second and third light receiving areas formed at either side of the first light receiving area in a radial direction of the optical disk, detecting the signal from the peripheral light of the first beam.

24. The optical pickup of claim 22, wherein the second light receiving portion generates the sub-reproduction signal $S_{sub}$ by summing a signal detected from the central light of the second beam by one of the sub-light receiving regions thereof, and the product of a signal detected from the peripheral light of the second beam by the other light receiving areas thereof and a gain factor $\delta$ which minimizes crosstalk from neighboring tracks of the optical disk.

25. The optical pickup of claim 24, wherein the second light receiving portion comprises the one light receiving area as a fourth light receiving area detecting the signal from the central light of the second beam, and the other light receiving areas comprise fifth and sixth light receiving areas formed at either side of the first light receiving area in a radial direction of the optical disk, detecting the signal from peripheral light of the second beam.

26. The optical pickup of claim 21, wherein the plurality of light receiving areas of the first light receiving portion comprises 8 areas a1 through a8 divided into a1-a4 and a5-a8 areas in a radial direction of the optical disk and in two in a tangential direction of the optical disk, with the four areas a2, a3, a6 and a7 being located in a middle of the first light receiving portion to receive the central light of the first beam, wherein the signal processor determines a track error signal with four areas (a1+a2), (a3+a4), (a5+a6), (a7+a8).

27. The optical pickup of claim 26, wherein the signal processor reduces crosstalk by determing (a1+a5), (a2+a6+a3+a7) and (a4+a8).

28. The optical pickup of claim 21, wherein the signal processor comprises a delay which delays a leading one of the main reproduction signal $S_m$ and the sub-reproduction signal $S_{sub}$ generated by the first and second light receiving portions to match phases of the main reproduction signal $S_m$ and the sub-reproduction signal $S_{sub}$.

29. An optical pickup used with an optical disk, comprising:

a light source emitting a light beam;

a light splitter which splits the light beam into first and second beams;

an optical element which focuses the first and second beams onto an optical disk and directs the first and second beams reflected from the optical disk; and a photoreceiver which corrects aberration caused by tilting of the optical disk based upon the reflected first and second light beams, wherein the photoreceiver corrects for spherical aberration caused by thickness variations of different optical disks based upon the first and second beams.

30. The optical pickup of claim 29, wherein the photoreceiver corrects for crosstalk between neighboring tracks on the optical disk based upon the reflected first and second beams.

31. An optical pickup used with an optical disk, comprising:

a light source emitting a light beam;

a light splitter which splits the light beam into first and second beams;

an optical element which focuses the first and second beams onto an optical disk and directs the first and second beams reflected from the optical disk; and a photoreceiver which corrects aberration caused by tilting of the optical disk based upon the reflected first and second light beams, wherein the photoreceiver corrects for crosstalk between neighboring tracks on the optical disk based upon the reflected first and second beams.

32. An optical pickup used with an optical disk, comprising:

a light source emitting a light beam;

a light splitter which splits the light beam into first and second beams, the second light beam having coma abberation; and an optical processing element producing a reproduction signal for which aberration caused by tilting of the optical disk is corrected based upon the first and second beams reflected from the optical disk, wherein the optical processing elements produce the reproduction signal which is corrected for spherical aberration caused by thickness variations of different optical disks.

33. An optical pickup used with an optical disk, comprising:

a light source emitting a light beam;

a light splitter which splits the light beam into first and second beams, the second light beam having coma abberation; and an optical processing element producing a reproduction signal for which aberration caused by tilting of the optical disk is corrected based upon the first and second beams reflected from the optical disk, wherein the optical processing elements produce the reproduction signal which is corrected for crosstalk between neighboring tracks on the optical disk.

* * * * *

UNITED STATES PATENT AND TRADEMARK OFFICE
CERTIFICATE OF CORRECTION

PATENT NO. : 6,785,209 B2 Page 1 of 1
DATED : August 31, 2004
INVENTOR(S) : Chong-sam Chung et al.

It is certified that error appears in the above-identified patent and that said Letters Patent is hereby corrected as shown below:

Column 15,
Line 6, change "δ" to -- α --.

Signed and Sealed this

Eleventh Day of January, 2005

JON W. DUDAS
*Director of the United States Patent and Trademark Office*